(12) United States Patent
Ferreira Araujo et al.

(10) Patent No.: US 7,613,808 B2
(45) Date of Patent: Nov. 3, 2009

(54) SYSTEM AND METHOD FOR ENHANCING EVENT CORRELATION WITH EXPLOITATION OF EXTERNAL DATA

(75) Inventors: Carlos Cesar Ferreira Araujo, Cary, NC (US); Ana Claudia Biazetti, Cary, NC (US); Anthony Bussani, Adliswil (CH); John E. Dinger, Cary, NC (US); Metin Feridun, Thalwil (CH); Juergen Schneider, Althengstett (DE)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 11/158,963

(22) Filed: Jun. 22, 2005

(65) Prior Publication Data

US 2006/0294222 A1 Dec. 28, 2006

(51) Int. Cl.
*G06F 15/173* (2006.01)
(52) U.S. Cl. .............. 709/226; 719/318; 719/313; 714/100; 709/224
(58) Field of Classification Search .......... 709/226, 709/224; 340/517; 707/6
See application file for complete search history.

(56) References Cited

U.S. PATENT DOCUMENTS

| | | | |
|---|---|---|---|
| 5,761,502 A | 6/1998 | Jacobs | 395/614 |
| 6,629,106 B1 | 9/2003 | Narayanaswamy et al. | 707/104.1 |
| 7,289,988 B2 * | 10/2007 | Joseph | 707/6 |
| 2002/0083168 A1 * | 6/2002 | Sweeney et al. | 709/224 |
| 2003/0023591 A1 | 1/2003 | Ma et al. | 707/6 |
| 2003/0195959 A1 | 10/2003 | Labadie et al. | 709/224 |
| 2003/0200192 A1 * | 10/2003 | Bell et al. | 707/1 |
| 2004/0015497 A1 | 1/2004 | Swarna et al. | 707/6 |
| 2004/0024767 A1 * | 2/2004 | Chen | 707/100 |
| 2004/0172409 A1 | 9/2004 | James | 707/104.1 |
| 2006/0208872 A1 * | 9/2006 | Yu et al. | 340/517 |
| 2007/0245357 A1 * | 10/2007 | Breiter et al. | 719/320 |

* cited by examiner

*Primary Examiner*—Thu Ha T Nguyen
*Assistant Examiner*—Brandon Wilgor
(74) *Attorney, Agent, or Firm*—VanLeeuwen & VanLeeuwen; Robert E. Straight (57) ABSTRACT

A system and method for enhancing event correlation with exploitation of external data is presented. A correlation engine receives events and selects a correlation rule that corresponds to the events. The correlation rule includes an event selection, a trigger condition, and a correlation conclusion. The correlation engine uses the event selection to access external data and select events based upon the external data. In turn, the correlation engine monitors the selected events and checks whether they meet the correlation rule's trigger condition. When the events meet the correlation rule's trigger condition, the correlation engine performs an action based upon the correlation rule's correlation condition.

3 Claims, 6 Drawing Sheets

```
eventSelection:
  // first event                210
    eventType: e1: "WAS transaction timeout"

//second event           220
    eventType: e2: "DB2 down"
                                                           230
    filtering predicate: Depends(RelationshipDB, e1.resource, e2.resource)
  triggerCondition: sequence in 10 minutes
                                              235
  correlationConclusion: correlateCauseAndEffect(e2,e1)  240
                         e2.priority = QueryPriority(BusinessPriorityDB, e2.resource)
                                                                              245
```

```
eventSelection:
  // first event                       255
    eventType: e1: OrderCreated            260
    filteringPredicate: orderDollarAmount > 200 AND
                        GetCustomerLevelFromCustomerDB(customerId) = SILVER
                                                                     265
  // second event                      270
    eventType: e2: OrderCompleted        275
    filteringPredicate: same orderId as e1
  triggerCondition:
              incomplete Sequence in 3 hours     280
  correlationConclusion:
              setCustomerLevelOnCustomerDB(customerID, GOLD)
                                                       285
```

SYSTEM AND METHOD FOR ENHANCING EVENT CORRELATION WITH EXPLOITATION OF EXTERNAL DATA

BACKGROUND OF THE INVENTION

1. Technical Field

The present invention relates in general to a system and method for enhancing event correlation with exploitation of external data. More particularly, the present invention relates to a system and method for including rule language in a correlation rule that instructs a correlation engine to access external data in order to effectively select and correlate events.

2. Description of the Related Art

In a typical customer environment, many Information Technology (IT) resources communicate with each other in order to support the customer's business processes. These resources include components such as network devices, servers, and applications. In addition to communicating with each other, many resources may also depend upon each other. For example, an application may depend upon a database and a server that supports the database. At large-scale deployments, IT resources and business processes typically include a tremendous amount of resource dependencies.

When a problem occurs with a resource, a system "event" is typically generated that informs a system administrator of the problem. However, with dependent resources, a problem in one resource may cause problems with many other dependent resources and business processes. This domino effect may quickly spread across a computer system, producing an overwhelming amount of events. A challenge found is for a system administrator to correlate the multitude of events in order to identify the cause of the problem.

Furthermore, another challenge found is that data that is "carried" along with the events is typically insufficient to effectively perform event correlation. In an attempt to resolve this issue, existing event correlation techniques may include dependencies and business priorities as part of its correlation rules. However, due to dynamically changing resource dependencies, this approach requires a tremendous amount of time to update and maintain the dependencies within the correlation rules.

Some computer systems may generate "business" events in response to particular actions. For example, a business order tracking system may generate an event when it receives an order and when it fulfills an order. In this example, the business order tracking system may wish to correlate "order created" events with "order completed" events for orders that are received from its preferred customers (e.g., fulfilled within a particular time). A challenge found again, however, is that the data that is included in the events is typically insufficient to effectively correlate orders with a customer's status level.

What is needed, therefore, is a system and method to improve event correlation techniques in a dynamic computer system environment.

SUMMARY

It has been discovered that the aforementioned challenges are resolved using a system and method to access external data based upon correlation rule language for improved event correlation. A correlation engine receives events and selects a correlation rule that corresponds to the events. The correlation rule includes an event selection, a trigger condition, and a correlation conclusion. The correlation engine uses the event selection to access external data and select events based upon the external data. In turn, the correlation engine monitors the selected events that occur across a period of time and checks whether they meet the correlation rule's trigger condition. When the events meet the correlation rule's trigger condition, the correlation engine performs one or more actions based upon the correlation rule's correlation conclusion. These actions may include access and/or updates to the external data. By not having the external data embedded in the correlation rules, the external data may change dynamically without impacting the correlation rules.

A computing device generates events and sends the events to a correlation engine over a computer network, such as the Internet. The events are particular event types, which may correspond to system events (e.g. "WAS transaction timeout") and/or business events, such as receiving a customer order (e.g. "OrderCreated"). The correlation engine receives the events and retrieves one or more correlation rules that correspond to the events. For example, if the correlation engine receives an "OrderCreated" event, the correlation engine retrieves one or more correlation rules that correspond to the "OrderCreated" event.

Correlation rules include three properties, which are an event selection, a trigger condition, and a correlation conclusion. The event selection includes filtering predicates, which the correlation engine uses to "filter out" events. For example, a business may wish to track customer orders that are over a particular dollar amount and the customer has achieved a "Silver" status level. The filtering predicates may include one or more external data filtering predicates and one or more event attribute filtering predicates.

The external data filtering predicate identifies external data for the correlation engine to access in order to filter events. For example, a correlation engine may access a dependency database to identify resource dependencies, or the correlation engine may access a customer database to identify a customer's status level.

The event attribute filtering predicate may include a value that the correlation engine compares with event attributes that are included in an event. For example, an event attribute filtering predicate may include a minimum dollar amount whereby the correlation engine selects events that correspond to customer orders that are over the minimum dollar amount.

Once the correlation engine selects events based upon the filtering predicates, the correlation engine evaluates the correlation rule's "trigger condition" and determines whether the trigger condition has been met. The trigger condition may be based on a single event or on a collection of events received over time. In the later case, the correlation engine monitors the current selected events until it receives the additional events required for the trigger condition. Using a customer order tracking system as an example, the trigger condition may be met if a customer order has not been fulfilled within three hours.

When the correlation engine detects that the trigger condition has been met, the correlation engine performs one or more actions based upon the correlation rule's "correlation conclusion." For example, the correlation conclusion may instruct the correlation engine to send an alert to a customer service representative if an order has not been fulfilled in a particular amount of time. In addition, the correlation conclusion may also instruct the correlation engine to access and/or modify external data. For example, when a customer order is not fulfilled within a particular amount of time, the correlation conclusion may instruct the correlation engine to modify external data to upgrade a customer's status level. By utilizing external data for event correlation, the external data may dynamically change without impacting the correlation rules.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
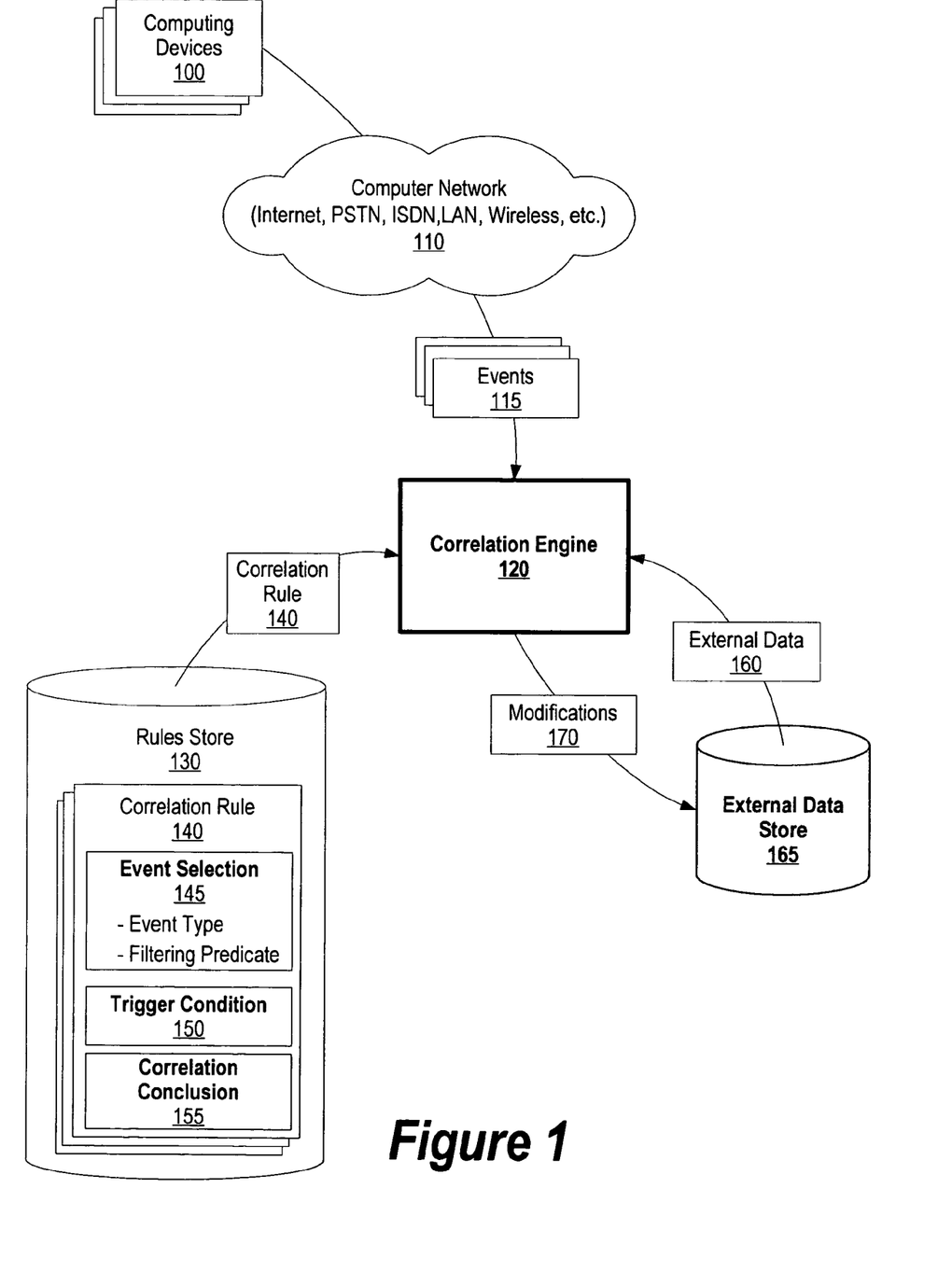
FIG. 1 is a diagram showing a correlation engine using external data to process events.

FIG. 1 is a diagram showing a correlation engine using external data to process events. Computing devices 100 generates events 115 and sends events 115 to correlation engine 120 over computer network 110, such as the Internet. Events 115 are particular event types, which may correspond to system events (e.g. "WAS transaction timeout") and/or business events, such as receiving a customer order (e.g. "OrderCreated").

Correlation engine 120 receives events 115 and identifies their corresponding event types. In turn, correlation engine 120 retrieves one or more correlation rules from rules store 130 that correspond to the event types, such as correlation rule 140. For example, if correlation engine 120 receives an event with an event type "OrderCreated," correlation engine 120 retrieves one or more correlation rules that correspond to the "OrderCreated" event type. Rules store 130 may be stored on a volatile or nonvolatile storage area, such as computer memory or a computer hard drive. In one embodiment, correlation engine 120 includes the correlation rules in its internal memory and selects the correlation rules from its internal memory.

Correlation rule 140 includes three properties, which are event selection 145, trigger condition 150, and correlation conclusion 155. Correlation engine 120 uses event selection 145 to filter out events that do not meet event selection 145's filtering predicates, which includes an external data filtering predicate and may include an event attribute filtering predicate. The external data filtering predicate identifies external data, such as external data store 165, that includes data for correlation engine 120 to access when filtering events, such as selecting events whose corresponding customer is rated at a particular status level.

The event attribute filtering predicate may include a value that correlation engine 120 compares with event attributes that are included in events 115. For example, an event attribute filtering predicate may include a minimum dollar amount whereby correlation engine 120 selects events that correspond to customer orders over that minimum dollar amount (see FIG. 4 and corresponding text for further details regarding event selection).

Once correlation engine 120 selects events based upon event selection 145 and external data 160, correlation engine 120 evaluates trigger condition 150 and determines whether trigger condition 150 has been met. Using a customer order tracking system as an example, trigger condition 150 may "trigger" if a customer order is not fulfilled within three hours.

When correlation engine 120 detects that trigger condition 150 is met, correlation engine 120 performs one or more actions based upon correlation conclusion 155. For example, correlation conclusion 155 may instruct correlation engine 120 to send an alert to a customer service representative if an order has not been fulfilled in a particular amount of time. Correlation conclusion 155 may also instruct correlation engine 120 to modify external data that is included in external data store 165. For example, when a customer order is not fulfilled within a particular amount of time, correlation conclusion 155 may instruct correlation engine 120 to send modifications 170 to external data store 165, which upgrades a customer's status level (see FIG. 5 and corresponding text for further details regarding correlation conclusion actions).

Figure 2A:
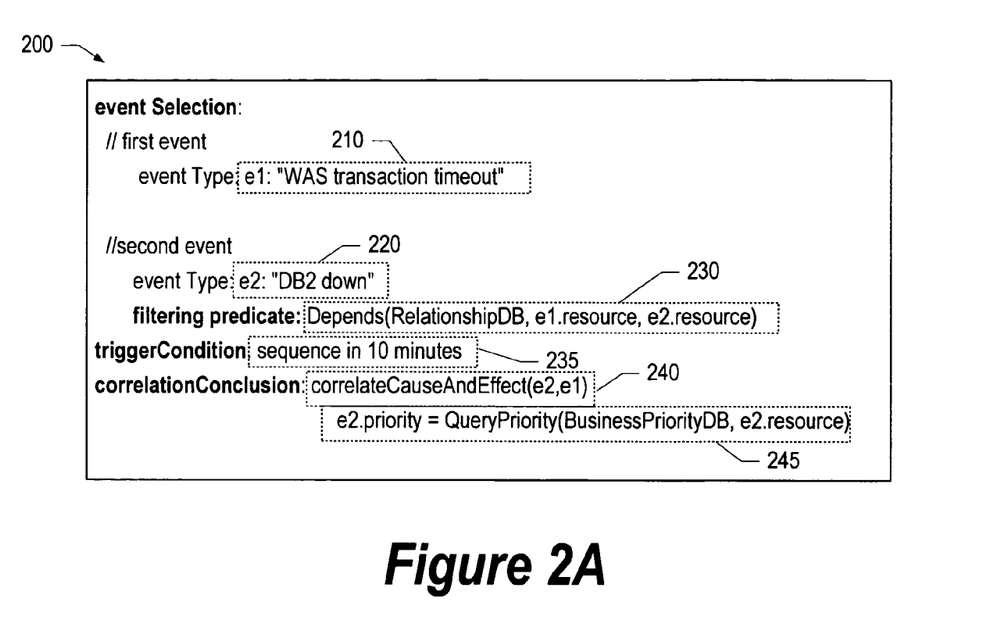
FIG. 2A is an example of a correlation rule that determines a root cause of system events.

FIG. 2A is an example of a correlation rule that determines a root cause of system events. When a correlation engine receives an event, the correlation engine identifies the event's corresponding event type, and retrieves correlation rules that have the corresponding event type. FIG. 2A is shown in generic text format for illustrative purposes. As one skilled in the art can appreciate, computer languages such as Extensible Markup Language (XML) may be used to create correlation rules.

Correlation rule 200 includes event types 210 and 220. When the correlation engine receives an event corresponding to event type 210, the correlation engine retrieves correlation rule 200 and waits for a period of time to monitor whether it receives an event corresponding to event type 220. The amount of time that the correlation engine waits is included in trigger condition 235 (10 minutes). Filtering predicate 230 instructs the correlation engine to access an external dependency database "RelationshipDB" and check whether event e1's resource depends on event e2's resource.

If event e1's resource depends on event e2's resource and both events are received within ten minutes of each other, trigger condition 235 is met, and, in turn, the correlation engine performs actions 240 and 245. Action 240 correlates e2 (DBDown) as a cause of e1 (WAS Transaction Timeout). Action 245 determines the business priority to assign to event cause e2(DBDown) by querying "BusinessPriorityDatabase." In turn, an operator may handle the event cause according to the impact that it has to business that depends upon the event cause resource.

Figure 2B:
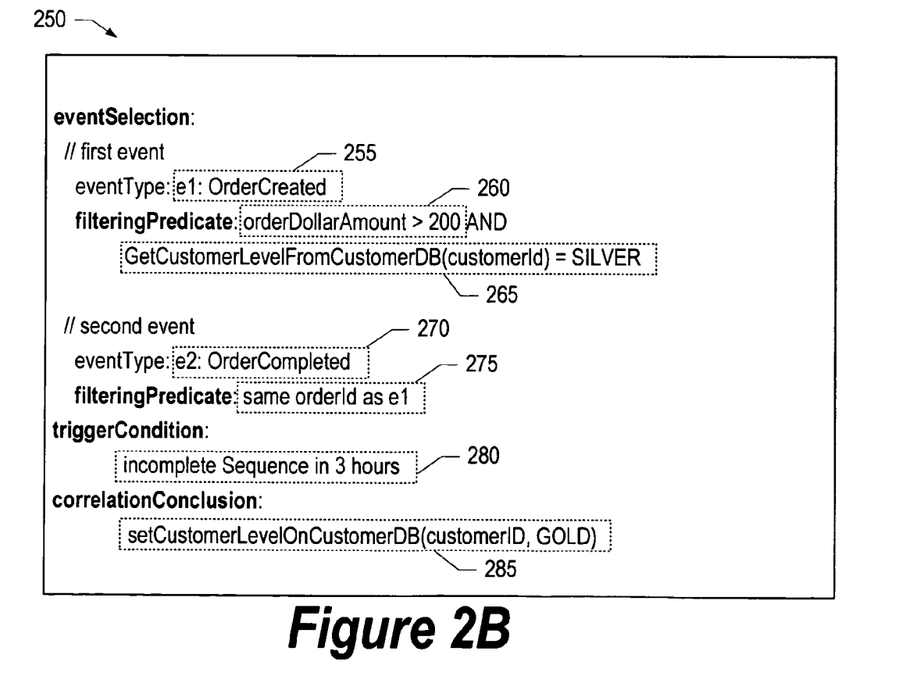
FIG. 2B is an example of a correlation rule that corresponds to monitoring business events.

FIG. 2B is an example of a correlation rule that corresponds to monitoring business events. FIG. 2B is shown in generic text format for illustrative purposes. As one skilled in the art can appreciate, computer languages such as Extensible Markup Language (XML) may be used to create correlation rules.

Correlation rule 250 includes event type 255, which is an "OrderCreated" event type. For example, a correlation engine may receive an event with a corresponding event type "OrderCreated" each time a customer places an order. Continuing with this example, the correlation engine selects correlation rule 250 when it receives such events because correlation rule 250 includes event type 255.

Correlation rule 250 also includes filtering predicates 260 and 265. Filtering predicates 260 and 265 are an event attribute filtering predicate and an external data filtering predicate, respectively. A correlation engine uses filtering predicate 260 to filter out events that do not have event attributes that correspond to orders larger than $200. Using filtering predicate 265, a correlation engine accesses an external database ("CustomerDB") and retrieves a customer's status level to check whether the customer's status level is "Silver." As such, correlation rule 250 instructs the correlation engine to select "OrderCreated" events that are over $200 and whose customer has a "Silver" status level.

Correlation rule 250 also includes event type 270, which is an "OrderCompleted" event type. Continuing with the example described above, a correlation engine receives an event with a corresponding event type "OrderCompleted" each time a customer order is fulfilled. Filtering predicate 275 instructs the correlation engine to accept "OrderCompleted" events that have the same "orderid" as the "OrderCreated" events that it has selected.

Correlation rule 250 includes trigger condition 280, which "triggers" if the correlation engine does not receive an "OrderCompleted" event within three hours of receiving an "OrderCreated" event. When the correlation engine detects that trigger condition 280 is met, the correlation engine performs an action based upon correlation conclusion 285. Correlation conclusion 285 instructs the correlation engine to access the external database "CustomerDB" and upgrade the customer's status level to "Gold" (see FIG. 5 and corresponding text for further details regarding correlation conclusion actions).

Figure 3:
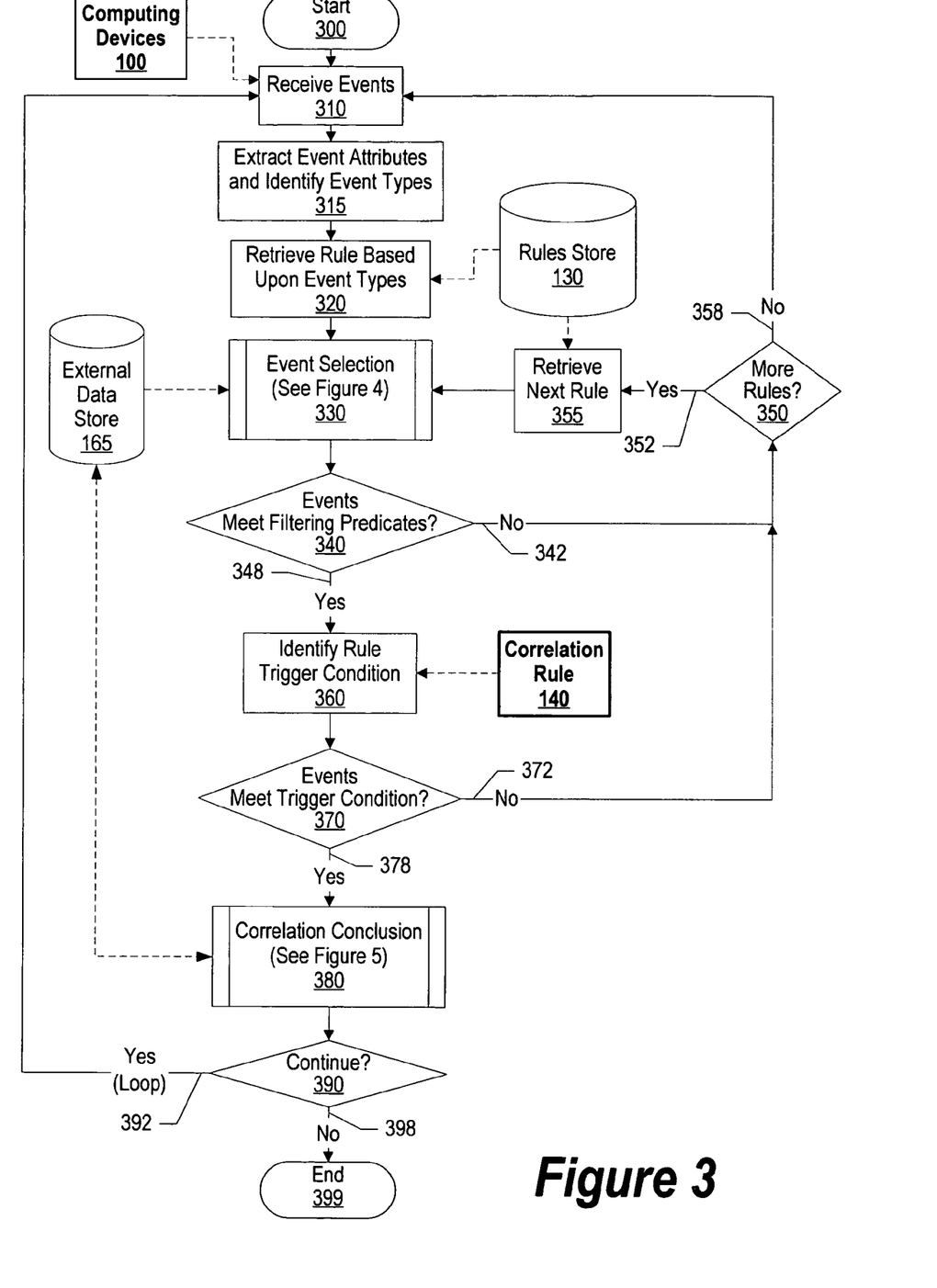
FIG. 3 is a high-level flowchart showing steps taken in correlating events across time based upon external data.

FIG. 3 is a high-level flowchart showing steps taken in correlating events across time based upon external data. A correlation engine receives events and uses correlation rules to select and monitor events that meet particular filtering predicates. The correlation engine monitors the events and detects whether trigger conditions are met that correspond to the correlation rules. When the correlation engine detects that a trigger condition is met, the correlation engine performs one or more actions based upon a correlation conclusion that is included in the correlation rules. These actions may access or update external data.

Correlation engine processing commences at 300, whereupon processing receives events from computing devices 100 at step 310. At step 315, processing extracts event attributes from the events, whereby the event attributes include an event type, such as "OrderCreated" and "OrderCompleted" (see FIGS. 2A, 2B, and corresponding text for further details regarding event types.

At step 320, processing retrieves a correlation rule that corresponds to the extracted event types from rules store 130. For example, the correlation engine may retrieve a correlation rule that corresponds to event types "OrderCreated" and "OrderCompleted." Rules store 130 is the same as that shown in FIG. 1. The correlation engine uses the extracted event attributes and external data from external data store 165 to filter out events that do not meet the correlation rule's filtering predicates (pre-defined process block 330, see FIG. 4 and corresponding text for further details). External data store 165 is the same as that shown in FIG. 1.

A determination is made as to whether the received events meet the correlation rule's filtering predicates (decision 340). For example, the correlation rule may have a filtering predicate to filter out customer orders that are not over a particular dollar amount. If the events do not meet the correlation rule's filtering predicates, decision 340 branches to "No" branch 342 whereupon a determination is made as to whether there are more correlation rules that correspond to the received events' event types (decision 350). If there more correlation rules that correspond to the received events' event types, decision 350 branches to "Yes" branch 352 whereupon processing retrieves (step 355) and processes the next correlation rule.

On the other hand, if there are not more correlation rules to process, decision 350 branches to "No" branch 358 whereupon processing receives more events from computing devices 100.

If the received events do meet the correlation rule's filtering predicates, decision 340 branches to "Yes" branch 348 whereupon the correlation engine identifies correlation rule 140's trigger condition at step 360. A trigger condition may include different types of event correlation patterns that the correlation engine checks as to whether the correlation patterns occur. For example, a trigger condition may be met when a customer order is not fulfilled within three hours (see FIGS. 2A, 2B, and corresponding text for further details regarding trigger conditions). Correlation rule 140 is the same as that shown in FIG. 1.

A determination is made as to whether the selected events meet correlation rule 140's trigger condition (decision 370). Using the example described above, the correlation engine checks whether it does not receive an "OrderCompleted" event within three hours of receiving an "OrderCreated" event. If the trigger condition is not met, decision 370 branches to "No" branch 372 whereupon the correlation engine continues processing correlation rules and receiving more events.

On the other hand, if the trigger condition is met, decision 370 branches to "Yes" branch 378 whereupon the correlation engine performs actions based upon a correlation conclusion that is included in correlation rule 140. The actions may include modifying external data that is included in external data store 165, such as upgrading a customer's status level (pre-defined process block 380, see FIG. 5 and corresponding text for further details).

A determination is made as to whether to continue to receive and process events (decision 390). If processing should continue, decision 390 branches to "Yes" branch 392, which loops back to receive more events. This looping continues until processing should terminate, at which point decision 390 branches to "No" branch 398 whereupon processing ends at 399.

Figure 4:
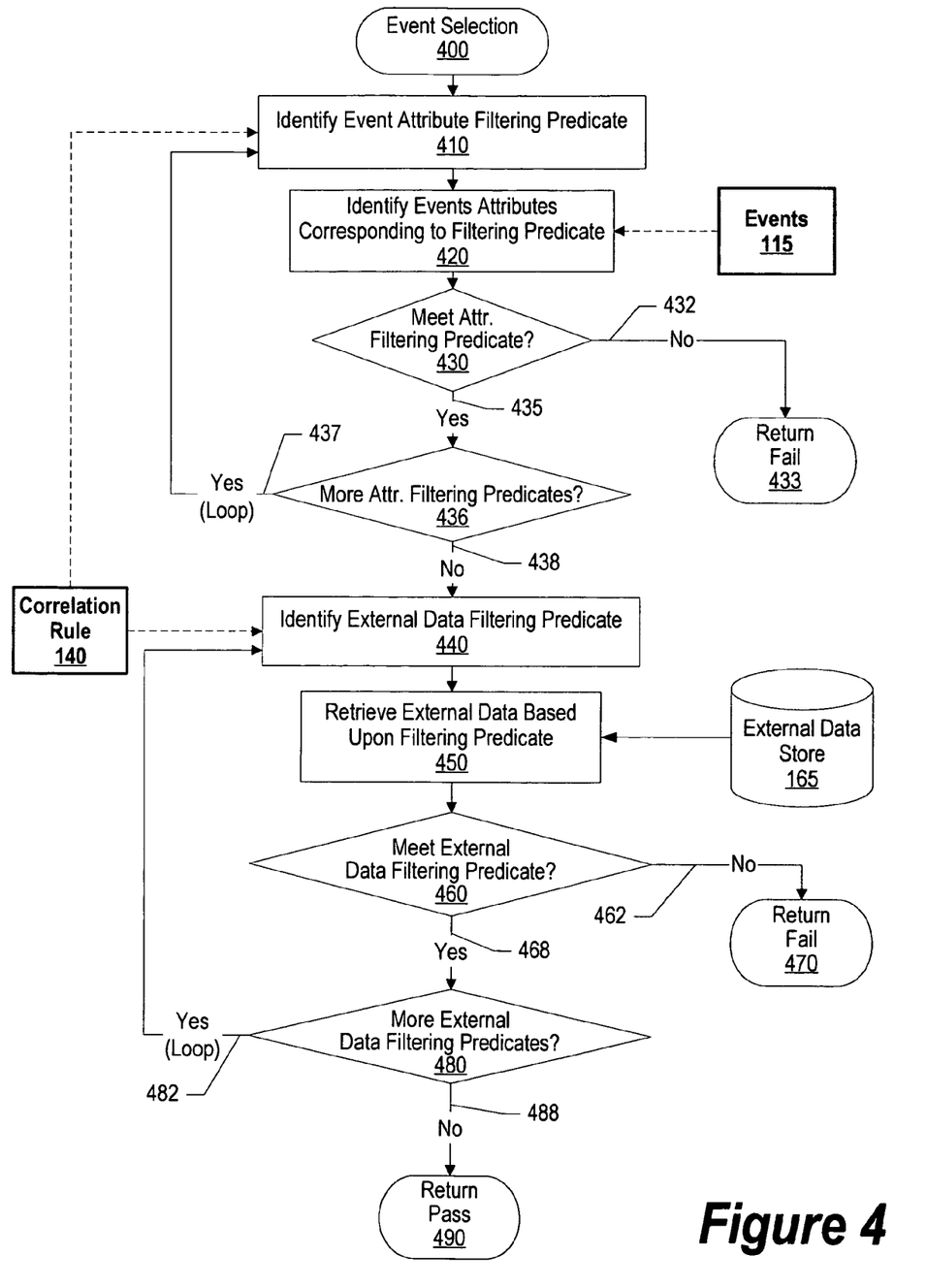
FIG. 4 is a flowchart showing steps taken in selecting events based upon correlation rule filtering predicates.

FIG. 4 is a flowchart showing steps taken in selecting events based upon correlation rule filtering predicates. A correlation engine received events and identified one or more correlation rules based upon the received events' event types. In turn, the correlation engine selects events that meet filtering predicates that are included in the rule language of the identified correlation rules.

Event selection processing commences at 400, whereupon processing identifies one or more event attribute filtering predicates that are included in correlation rule 140 (step 410). Correlation rule 140 is a rule that corresponds to events 115 event types, which the correlation engine selected in FIG. 3. For example, correlation rule 140 may include an event attribute filtering predicate "OrderDollarAmount>300." At step 420, processing identifies events 115's attributes that correspond to the event attribute filtering predicate. Events 115 were received by the correlation engine and are the same as that shown in FIG. 1.

A determination is made as to whether events 115 meet correlation rule 140's event attribute filtering predicate (decision 430). If events 115 do not meet correlation rule 140's event attribute filtering predicate, decision 430 branches to "No" branch 432 whereupon processing returns a fail at 433. For example, a business may set an event attribute filtering predicate to monitor the status of orders placed over a certain dollar amount.

On the other hand, if events 115 meet correlation rule 140's event attribute filtering predicate, decision 430 branches to "Yes" branch 435. A determination is made as to whether there are more event attribute filtering predicates included in correlation rule 140 (decision 436). If there are more event attribute filtering predicates to process, decision 436 branches to "Yes" branch 437 which loops back to select and process the next event attribute filtering predicate. This looping continues until there are no more event attribute filtering predicates to process, at which point decision 436 branches to "No" branch 438.

At step 440, processing retrieves an external data filtering predicate from correlation rule 140. The external data filtering predicate includes a condition and identifies external data from which the correlation engine retrieves data. For example, an external data filtering predicate may be "GetCustLevelFromCustDB(customerID)=Silver." In this example, processing accesses an external database named "customerDB" and retrieves a customer level that corresponds to events 115. At step 450, processing retrieves external data from external data store 165. External data store is the same as that shown in FIG. 1, and may be stored on a non-volatile storage area, such as a computer hard drive.

A determination is made as to whether correlation rule 140's external data filtering predicate is met (decision 460). Using the example described above, processing determines whether the retrieved data includes a "Silver" customer level. If the external data filtering predicate is not met, decision 460 branches to "No" branch 462 whereupon processing returns a fail at 470. On the other hand, if the external data filtering predicate is met, decision 460 branches to "Yes" branch 468 whereupon a determination is made as to whether there are more external data filtering predicates to process in correlation rule 140 (decision 480). If there are more external data filtering predicates to process, decision 480 branches to "Yes" branch 482 whereupon processing loops back to select and process the next external data filtering predicate. This looping continues until there are no more external data filtering predicates to process, at which point decision 480 branches to "No" branch 488 whereupon processing returns a pass at 490.

Figure 5:
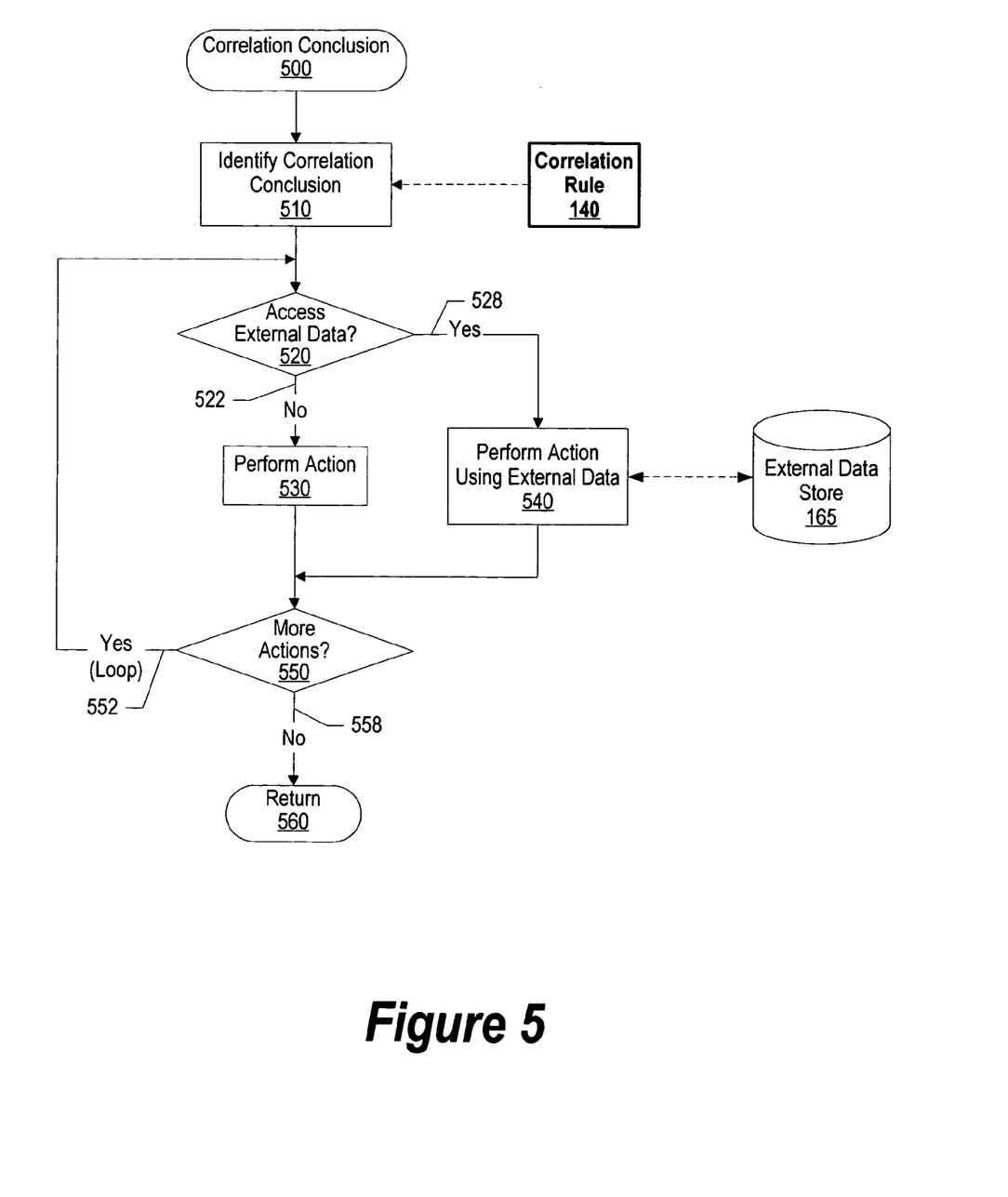
FIG. 5 is a flowchart showing steps taken in performing an action based upon correlation rule conclusions.

FIG. 5 is a flowchart showing steps taken in performing one or more actions based upon a correlation rule conclusion. A correlation engine monitors events and waits for corresponding trigger conditions to be met. When the correlation engine detects that a trigger condition is met, the correlation engine processes a correlation conclusion that is included in the correlation rule's rule language.

Correlation conclusion processing commences at 500, whereupon processing identifies correlation rule 140's correlation conclusion at step 510. For example, a correlation conclusion may upgrade a customer's status level if the customer's order is not fulfilled in a particular amount of time.

A determination is made as to whether the correlation conclusion includes accessing external data (decision 520). Using the example described above, the correlation engine may access external data in order to upgrade a customer's status level. In another example, the correlation conclusion may instruct the correlation engine to send an alert to a supervisor, in which case external data may not need to be accessed.

If the correlation engine should not access external data in order to perform the correlation conclusion, decision 520 branches to "No" branch 522 whereupon processing performs the corresponding action at step 530, such as sending an alert to a supervisor. On the other hand, if the correlation engine should access external data in order to perform the correlation conclusion, decision 520 branches to "Yes" branch 528 whereupon processing accesses external data store 165 and performs the correlation conclusion action, such as upgrading a customer's status level (step 540).

A determination is made as to whether there are more actions to perform based upon the correlation conclusion (decision 550). For example, the correlation conclusion may include two actions, such as instructing the correlation engine to send an alert to a supervisor, and then upgrade a customer's status level. If there are more actions to perform, decision 550 branches to "Yes" branch 552 which loops back to process the next action. This looping continues until there are no more actions to perform, at which point decision 550 branches to "No" branch 558 whereupon processing returns at 560.

Figure 6:
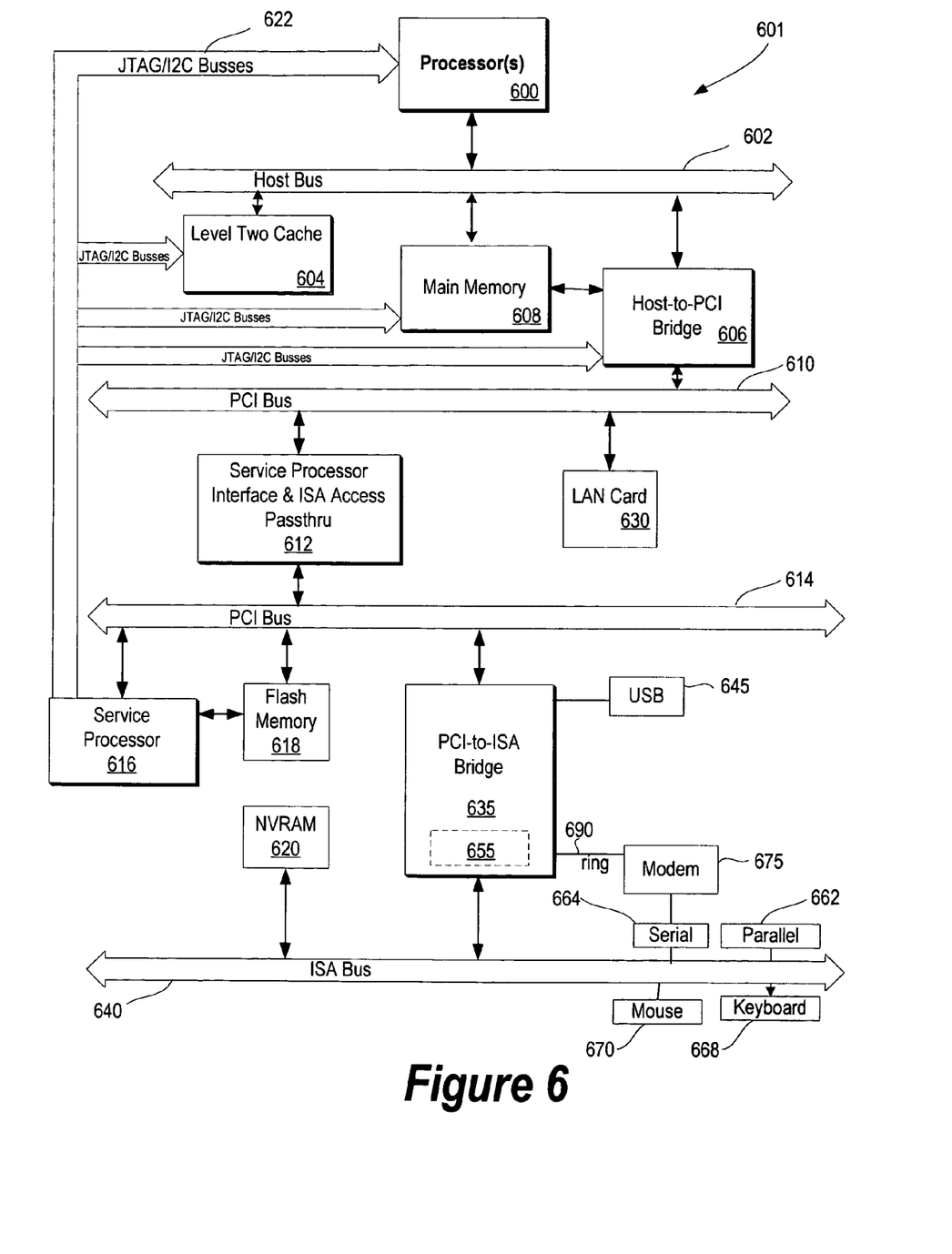
FIG. 6 is a block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a first event from a computing device over a computer network, wherein the first event is selected from the group consisting of a computer system event and a business event, the computer system event corresponding to a resource problem within a computer system and the business event corresponding to a business transaction;
   comparing the first event with a plurality of correlation rules in order to identify one of the plurality of correlation rules that corresponds to the first event;
   selecting one of the correlation rules in response to the comparing;
   in response to selecting the correlation rule, retrieving an external data filtering predicate from the selected correlation rule, wherein the external data filtering predicate identifies external data in which to retrieve;
   retrieving the external data based upon the external data filtering predicate;
   determining whether the external data meets the external data filtering predicate;
   in response to determining that the external data meets the external data filtering predicate, retrieving a trigger condition from the selected correlation rule, wherein the trigger condition includes a correlation pattern that corresponds to the first event and a second event;
   detecting that the second event occurred;
   in response to detecting that the second event occurred, retrieving a correlation conclusion from the selected correlation rule; and
   performing the correlation conclusion action, wherein the correlation conclusion action includes modifying the external data.

2. A computer program product stored in a computer storage medium that stores computer instructions that, when executed by an information handling system, causes the information handling system to perform actions comprising:
   receiving a first event from a computing device over a computer network, wherein the first event is selected from the group consisting of a computer system event and a business event, the computer system event corresponding to a resource problem within a computer system and the business event corresponding to a business transaction;
   comparing the first event with a plurality of correlation rules in order to identify one of the plurality of correlation rules that corresponds to the first event;
   selecting one of the correlation rules in response to the comparing;
   in response to selecting the correlation rule, retrieving an external data filtering predicate from the selected correlation rule, wherein the external data filtering predicate identifies external data in which to retrieve;
   retrieving the external data based upon the external data filtering predicate;
   determining whether the external data meets the external data filtering predicate;
   in response to determining that the external data meets the external data filtering predicate, retrieving a trigger condition from the selected correlation rule, wherein the trigger condition includes a correlation pattern that corresponds to the first event and a second event;
   detecting that the second event occurred;
   in response to detecting that the second event occurred, retrieving a correlation conclusion from the selected correlation rule; and
   performing the correlation conclusion action, wherein the correlation conclusion action includes modifying the external data.

3. An information handling system comprising:
   one or more processors;
   a memory accessible by the processors;
   one or more nonvolatile storage devices accessible by the processors; and
   an event correlation tool comprising software code executed by the processors to perform steps comprising:
      receiving a first event from a computing device over a computer network, wherein the first event is selected from the group consisting of a computer system event and a business event, the computer system event corresponding to a resource problem within a computer system and the business event corresponding to a business transaction;

comparing the first event with a plurality of correlation rules stored in one of the nonvolatile storage devices in order to identify one of the plurality of correlation rules that corresponds to the first event;

selecting one of the correlation rules in response to the comparing;

in response to selecting the correlation rule, retrieving an external data filtering predicate from the selected correlation rule, wherein the external data filtering predicate identifies external data in which to retrieve;

retrieving the external data from one of the nonvolatile storage devices based upon the external data filtering predicate;

determining whether the external data meets the external data filtering predicate;

in response to determining that the external data meets the external data filtering predicate, retrieving a trigger condition from the selected correlation rule, wherein the trigger condition includes a correlation pattern that corresponds to the first event and a second event;

detecting that the second event occurred; and performing the correlation conclusion action, wherein the correlation conclusion action includes modifying the external data.

* * * * *

UNITED STATES PATENT AND TRADEMARK OFFICE
CERTIFICATE OF CORRECTION

| | | |
|---|---|---|
| PATENT NO. | : 7,613,808 B2 | Page 1 of 1 |
| APPLICATION NO. | : 11/158963 | |
| DATED | : November 3, 2009 | |
| INVENTOR(S) | : Araujo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Nineteenth Day of October, 2010

David J. Kappos
*Director of the United States Patent and Trademark Office*